United States Patent Office 2,824,083
Patented Feb. 18, 1958

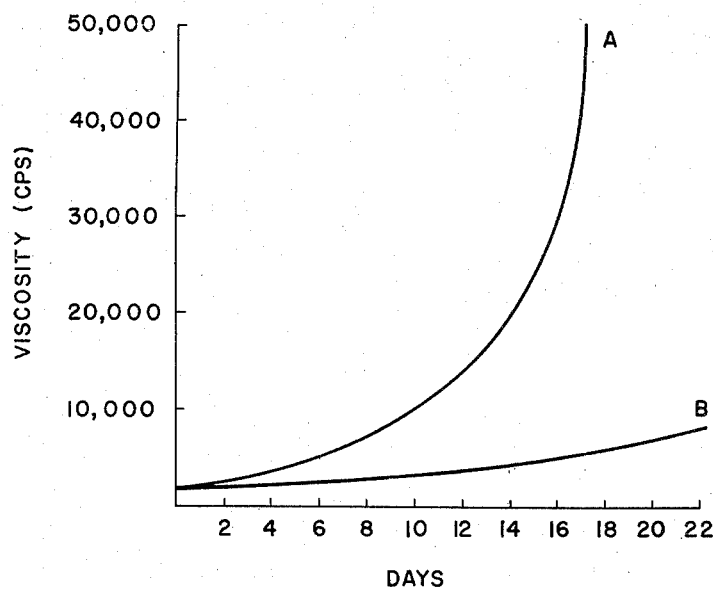

2,824,083

COMPOSITIONS CONTAINING BF₃ COMPLEXES AND THEIR USE AS CURING AGENTS FOR POLYEPOXIDES

Harvey L. Parry, Maplewood, N. J., and William A. Hubbard, Evanston, Ill., assignors to Shell Development Company, New York, N. Y., a corporation of Delaware Application December 27, 1955, Serial No. 555,604

9 Claims. (Cl. 260—47)

This invention relates to new compositions containing boron trifluoride derivatives and to their use, particularly as curing agents for polyepoxides.

Specifically, the invention provides new compositions containing BF₃ complexes which are particularly useful and valuable as curing agents for the resinification of polyepoxides. These compositions comprise a BF₃ addition compound, and preferably an addition product of BF₃ and an amine and BF₃ and a phenol, dissolved in a liquid polyol, and particularly a liquid polyalkylene glycol having a molecular weight above 100. The invention further provides an improved process for resinification of polyepoxides which comprises heating the polyepoxide with a small amount of the above-described compositions.

It is known that BF₃ complexes, such as the addition product of BF₃ and an amine, cure epoxy resins, such as glycidyl ethers of polyhydric phenols, to form hard chemical resistant products. These materials, however, have not proved to be very useful as commercial curing agents for the epoxy resins. The most active complexes are, for example, solid materials and it is difficult to prepare a homogeneous mixture of the resins and complex which is necessary to effect an even cure. In addition, the mixture of BF₃ complex and epoxy resin has a relatively short pot life and must be used very shortly after its preparation. This is particularly undesirable for small plant operations where small amounts of the resinous mixture are utilized over a long period of time. Some of the most active complexes, e. g., BF₃ phenol, cause almost instantaneous gelation when mixed with the resin, hence the proper dispersion of the complex in the resin is impossible. Furthermore, the cured products obtained by the use of the BF₃ complexes fail to have the flexibility and impact strength required for many industrial applications.

It is an object of the invention to provide new compositions containing BF₃ addition compounds. It is a further object to provide new compositions containing BF₃ addition compounds which are particularly useful and valuable as curing agents for polyepoxides. It is a further object to provide new BF₃ addition compound compositions which are liquid and easily combined with polyepoxides. It is a further object to provide new compositions containing BF₃ addition products which form mixtures with polyepoxides having unexpectedly long pot life. It is a further object to provide a feasible method for the use of the very active BF₃ addition products as epoxide curing agents. It is a further object to provide BF₃ addition product compositions which rapidly cure epoxy resins to form cured products having improved flexibility and impact strength. It is a further object to provide a new process for curing polyepoxides. Other objects and advantages of the invention will be apparent from the following detailed description thereof.

It has now been discovered that these and other objects of the invention can be accomplished by the new compositions of the invention comprising BF₃ addition products, and preferably products of BF₃ and an amine, amide, phenol or ether, dissolved in a liquid polyol and preferably a liquid polyalkylene glycol having a molecular weight above 100. It has been found that these particular compositions are excellent curing agents for polyepoxides. Because of their liquid nature, the new compositions are easily mixed with the polyepoxide material to form homogeneous compositions. In the case of certain very reactive complexes, notably BF₃ phenol, the mixture of the BF₃ complex and the polyol provides a feasible means of introducing the BF₃ complex into the polyepoxide without instantaneous gelation. When heat is applied these mixtures containing the above curing compositions and the polyepoxides set up in a short time to form hard cured products having good flexibility and impact strength. In the absence of applied heat, the mixtures of the BF₃ complex compositions and polyepoxides have unexpectedly long pot life and can be allowed to stand for a very long period of time without gelation. This is quite in contrast to the mixtures of the BF₃ addition products by themselves with the polyepoxides which have relatively short pot life as shown in the examples at the end of the specification.

The BF₃ addition products employed in preparing the curing compositions of the invention are preferably the addition products obtained by combination of boron trifluoride with amines, amides, phenols or ethers. The phenolic compounds may be mono-polynuclear and mono or polyhydric, such as, for example, phenol, bis-phenol, resorcinol, catechol, 2,2-bis(4-hydroxyphenyl)butane, and the like. The amine compounds can be, for example, a primary, secondary, or tertiary aliphatic amine, such as methylamine, dimethylamine, trimethylamine, 2-ethylhexylamine, stearylamine, allylamine, monoethanolamine, diethanolamine, triethanolamine, monoisopropanolamine, diisopropanolamine, triisopropanolamine, ethylene diamine, triethylene tetraamine, tetraethylene pentamine, aminoethylethanolamine, etc.; aromatic amines, such as o-phenylenediamine, m-phenylene diamine, p-phenylene diamine, o-toluidine, m-toluidine, p-toluidine, benzylamine, methylaniline, diphenylamine, triphenylamine, etc., pyridine, compounds having condensed pyridine rings and their homologues and other derivatives, such as, for example, alpha-picoline, beta-picoline, gamma-picoline, the lutidines such as 2,6-lutidine, the collidines, 2-ethanolpyridine, 4-ethanolpyridine, 2-hexylpyridine, 2-propanolpyridine, 4-propanolpyridine, 2-vinylpyridine, quinoline, isoquinoline, quinaldine, lepidine, etc., aminopyridines and homologues thereof, for example, 2-aminopyridine, 2-amino-4-methylpyridine, 2-amino-3-methylpyridine, etc.; cycloalkylamines, such as, for example, cyclohexylamine, dicyclohexylamine, piperidine, etc.

The ethers are exemplified by dimethyl ether, diethyl ether, methyl ethyl ether, butyl ether, isopropyl butyl ether, methyl amyl ether, methyl hexyl ether, dimethyl ether of ethylene glycol, phenyl methyl ether, benzyl ethyl ether, ethyl Cellosolve and dibenzyl ether.

The amides are exemplified by acetamide, dimethyl formamide, propionamide, dimethyl propionamide, valeramide, ethyl valeramide, discetamide, benzamide, and the like.

Preferred coordinate compounds are the addition compounds of BF$_3$ and members of the following groups: the aliphatic and aromatic hydrocarbon monoamines, the aliphatic hydrocarbon monocarboxylic acid amides and the aliphatic and aromatic ethers, and more preferably the addition compounds of BF$_3$ and the alkyl and aryl monoamines, the amides of the alkanoic acids and the dialkyl and diaryl ethers, each of which preferably contains no more than 16 carbon atoms.

Many of these addition compounds and their preparation are illustrated in Booth's "Boron Trifluoride and Its Derivatives," 1949, Wiley and Sons.

The BF$_3$ complexes may be prepared by conventional methods. The preferred BF$_3$ amine complexes are prepared by passing BF$_3$ gas over or into a solution containing the amine, or by adding the amine dropwise to a reaction flask containing BF$_3$ etherate and excess ether while keeping the mixture at a temperature of about 35° C., and after the reaction has subsided, removing the excess ether.

The preparation of some of the BF$_3$ amine complexes is shown below.

*BF$_3$ dimethylaniline.*—60.5 g. (1.2 mols) of dimethyl aniline was stirred at a temperature of 10–20° C. while BF$_3$ gas was intermittently passed over the surface for 4½ hours. The resulting solid complex had a light green color.

*BF$_3$ triethyl amine.*—One mol of triethyl amine was added dropwise with stirring to a solution of 1 mol of BF$_3$ etherate diluted with excess diethyl ether at −20° C. The addition complex crystallized out of solution and was separated by filtration and washed with cold ether.

*BF$_3$ trimethyl amine.*—Five parts of trimethyl amine were condensed in 110 parts of petroleum ether cooled to −50° C. BF$_3$ gas was added to this solution at a temperature below 6° C. until addition of further BF$_3$ resulted in no temperature rise. The white solid which had formed was filtered on a Buchner Funnel and washed with cold petroleum ether.

*BF$_3$ dimethyl benzyl amine.*—Thirty-four parts of dimethyl benzyl amine was dissolved in 25 parts of petroleum ether and agitated while BF$_3$ gas was passed over the surface. The temperature was kept below 13° C. by cooling. After 4 hours, 21.5 parts of white powder complex were recovered by filtration.

*BF$_3$ ethyl aniline.*—BF$_3$ gas was bubbled into ethyl aniline at room temperature. When the BF$_3$ gas began to be given off in copious quantities, the addition was stopped and legert vacuum applied. Resulting products was a viscous liquid complex of BF$_3$ and ethyl aniline.

*BF$_3$ tripropyl amine.*—72.5 parts of tripropyl amine was dissolved in 50 parts of petroleum ether. BF$_3$ gas was passed intermittently over the surface of the solution, which was agitated and cooled externally with ice to keep the temperature down below 6° C. After three hours, the while crystalline solid was filtered off, washed twice with petroleum ether and air dried.

*BF$_3$ lauryl amine.*—185 parts of lauryl amine was dissolved in 1000 parts of toluene and treated with BF$_3$ gas at a temperature below 13° C. The complex was precipitated by the addition of petroleum ether.

*BF$_3$ ammonia.*—200 parts of BF$_3$-diethyl ether complex (45% BF$_3$) and 200 parts of diethyl ether were agitated in a container and NH$_3$ gas was passed over the surface. The product was filtered and occluded gases removed by heating at 50° C. under vacuum. The product so obtained had a melting point above 250° C.

*BF$_3$ phenylhydrazine.*—75 parts of phenylhydrazine was dissolved in 200 parts of benzene and BF$_3$ gas was passed through until the reaction was complete. A white solid was recovered as the desired complex.

*BF$_3$ hexanolamine.*—50 parts of hexanolamine was placed in 200 parts of benzene. BF$_3$ gas was passed through the solution with stirring until the reaction was complete. The crude product was a sticky material resembling diethylenetriamine BF in its appearance. The hexanolamine-BF$_3$ is soluble in butyl "Carbitol," acetone, methyl ethyl ketone, and water.

*BF$_3$ diethylene triamine.*—151 parts (1 mole) of BF$_3$-ether solution was placed in 200 parts of diethyl ether. 34 parts of diethylenetriamine in 70 parts of diethyl ether was then slowly added. The product separated as a gummy mass which became hard after the solvent escaped by air drying. The product was soluble in pyridine, methyl "Cellosolve," and water, being difficultly soluble in alcohol and methyl ethyl ketone. It could not be recrystallized. The melting point of the crude material was above 200° C.

*BF$_3$ N-butyl amine.*—75 parts of BF$_3$ ether complex was added to 150 parts of diethyl ether. A solution of 36.5 parts of n-butyl amine in 100 parts of diethyl ether was then very gradually added to the mixture with continued stirring. Upon filtering and drying, a white crystalline product was obtained.

*BF$_3$ amylamine.*—187 parts of amylamine was dissolved in 200 parts of diethyl ether and 151 parts of BF$_3$-ether complex was added thereto very gradually with stirring. The solution was cooled and filtered and a white crystalline product was obtained.

*BF$_3$ decylamine.*—75 parts of BF$_3$-ether complex was added to 150 parts of diethyl ether, and a solution of 78 parts of decyl amine in 100 parts of diethyl ether was added thereto with stirirng. On cooling and filtering, a yellow solid was obtained.

*BF$_3$ aniline.*—100 parts of aniline dissolved in 400 parts of benzene were placed in a 1-liter flask. Dry borontrifluoride gas was bubbled into the benzene solution, and the resulting crystals removed by filtration.

*BF$_3$ morpholine.*—87 parts of morpholine was stirred while 151 parts of a BF$_3$ ether complex (45% BF) in 100 parts of ethyl ether was added dropwise. On cooling the reaction mixture, an orange-yellow solid separated. The complex was washed with dry ethyl ether. It was insoluble in methyl ethyl ketone.

*BF$_3$ benzyl aniline.*—To a solution of 286 parts of benzyl aniline in 155 parts of anhydrous ether was added dropwise 200 parts of BF$_3$ ether complex (45% BF$_3$). The yellow precipitate was separated by filtration. This complex melted at 125° C.–155° C. with decomposition.

*BF$_3$ pyridine.*—69 parts of pyridine was stirred while 151 parts of BF$_3$ ether complex was added dropwise. The reaction was exothermic and the reaction mixture was cooled to aid precipitation of the complex. The white crystals which separated were collected on a filter and air dried.

The polyols used in the preparation of the curing compositions are liquid organic compounds possessing a plurality of aliphatic hydroxyl groups. Examples of these liquid polyols include, among others, diethylene glycol, triethylene glycol, polyethylene glycol having a molecular weight of about 400, dipropylene glycol, tripropylene glycol, pentapropylene glycol, hexanetriol-1,2,6, polyallyl alcohol, having a molecular weight of about 500, polyvinyl alcohol, glycerol, alpha-methoxyglycerol, alpha-methyl glycerol, 1,3,6-octanetriol, trimethylolpropane and the like and mixtures thereof.

Particularly preferred polyols are the aliphatic polyhydric alcohols having a molecular weight of at least 100, and more preferably polyalkylene glycols having a molecular weight between 100 and 600. The polyols preferably have viscosities ranging from about 25 centipoises to about 200 centipoises.

The curing compositions of the invention are obtained by combining the above-described BF$_3$ complexes with any one or more of the above-described liquid polyols. The amounts of each employed will depend upon the agents selected. In general, the amount of the BF$_3$ complex employed will vary from 1.0 to 100 per 100 parts of polyol and more preferably from 10 to 100 parts per 100 parts of polyol.

The combination may be made by mere mixing the two components together at room temperature. Heat may be applied if necessary to hasten dissolution of the solid complexes in the liquid polyols.

As noted above, the combination of $BF_3$ complex and polyol is particularly useful as curing agents for polyepoxides. The amount of the curing compositions added should be such as to furnish at least .01 part to about 10 parts of the $BF_3$ complex per 100 parts of the polyepoxide. More preferably, the curing compositions should be added so as to furnish from 1 part to 5 parts of the $BF_3$ complex per 100 parts of polyepoxide.

In curing the polyepoxides, it is sometimes desirable to have the polyepoxide in a mobile liquid condition when the above described curing mixture is used in the resinification process so as to facilitate mixing. With those polyepoxides that are liquid, but too viscous for ready mixing, one may either heat to reduce viscosity, or have a liquid solvent added thereto in order to provide fluidity. Normally solid polyepoxides are likewise either melted or mixed with a liquid solvent. Various solvents are suitable for achieving the desired fluidity. They may be volatile solvents which escape from the polyepoxide composition containing the $BF_3$ complex-polyol mixture by evaporation before or during the curing, such as ketones like acetone, methyl ethyl ketone, methyl isobutyl ketone, isophorone, etc.; esters such as ethyl acetate, butyl acetate, Cellosolve acetate (ethylene glycol monoacetate) methyl Cellosolve acetate (acetate of ethylene glycol monomethyl ether), etc.; ether alcohols, such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons, such as benzene, toluene, xylene, etc. Solvents which remain in the cured composition may also be used, such as diethyl phthalate, dibutyl phthalate, or liquid monoepoxy compounds, including glycidyl allyl ether, glycidyl phenyl ether, styrene oxide, 1,2-hexylene oxide, glycide, and the like, as well as cyano-substituted hydrocarbons, such as acetonitrile, propionitrile, adiponitrile, benzonitrile, and the like. It is also convenient to employ the solid or semi-solid polyepoxides in combination with a liquid polyepoxide such as a normally liquid glycidyl polyether of a polyhydric alcohol. Various other ingredients may be mixed with the polyepoxide composition including pigments, fillers, dyes, plasticizers, resins, and the like.

Cure of the polyepoxide is generally accomplished by heating the mixture of the polyepoxide and curing composition, preferably at temperatures above 50° C. Excellent rates of cure are obtained at temperatures from 100° C. to 200° C. and these are preferred from many applications where heating is permissible. Temperatures much above 200° C. are generally not desirable but may be employed if necessary. Compositions containing very active complexes such as $BF_3$-phenol can be cured at room temperatures.

The curing agent-polyepoxide systems described above may be utilized for a great variety of important applications. They are particularly useful in the preparation of coating compositions, such as baking enamels. In these applications, it is generally desirable to combine the polyepoxide with the curing composition and desired solvents or other film-forming materials, and then apply this mixture to the surface to be coated. The coatings may then be allowed to set at room temperature or heat may be applied.

The above-described systems are also useful in the preparation of laminates. In this application, the sheets of fibrous material are first impregnated with the mixture of polyepoxide and curing composition. This is conveniently accomplished by mixing the curing composition and polyepoxide in a solvent, such as acetone, so as to obtain a fluid mixture. The sheets of fibrous material are impregnated with the mixture by spreading it thereon or by dipping or otherwise immersing them in the impregnant. The solvent is conveniently removed by evaporation and the mixture is cured to the fusible resin stage. Although this operation may be conducted at room temperature (20 to 25° C.), it is preferred to use somewhat elevated temperature such as about 50° C. to 200° C. with the impregnated sheet stock passing through or hanging free in an oven or other suitable equipment. The resinification is arrested before infusible product occurs by cooling below about 40° C. A plurality of the impregnated sheets are then superposed and the assembly is cured in a heated press under a pressure of about 25 to 500 or more pounds per square inch. The resulting laminate is extremely strong and resistant against the action of organic and corrosive solvents. The fibrous material used in the preparation of the laminates may be of any suitable material, such as glass cloth and matting, paper, asbestos paper, mica flakes, cotton bats, duck muslin, canvas and the like. It is usually preferred to utilize woven glass cloth that has been given prior treatment with well known finishing or sizing agents, therefor, such as chrome methacrylate or vinyl trichlorosilane.

In the above applications, the resulting cured products are characterized by their hardness and improved flexibility.

The polyepoxides to be cured by use of the above process are those possessing at least two

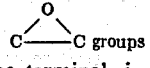

groups

These groups may be terminal, i. e.

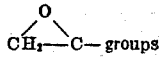

groups or they may be in an internal position. Preferably the epoxy groups are terminal. The polyepoxides may be saturated or unsaturated, aliphatic, cycloaliphatic, aromatic or heterocyclic and may be substituted if desired with substituents, such as chlorine atoms, hydroxyl groups, ether radicals, and the like. They may also be monomeric or polymeric.

For clarity, many of the polyepoxides and particularly those of the polymeric type will be described throughout the specification and claims in terms of epoxy equivalent value. The meaning of this expression is described in U. S. 2,633,458.

If the polyepoxide material consists of a single compound and all of the epoxy groups are intact, the epoxy equivalency will be integers, such as 2, 3, 4 and the like. However, in the case of the polymeric type polyepoxides many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material may, for example, have epoxy equivalent values, such as 1.5, 1.8, 2.5, and the like.

Various examples of polyepoxides that may be used in the process of the invention are given in U. S. 2,633,458 and it is to be understood that so much of the disclosure of that patent relative to examples of polyepoxides is incorporated by references into this specification.

The glycidyl polyethers of polyhydric phenols obtained by condensing the polyhydric phenols with epichlorohydrin as described in U. S. 2,633,458 are also referred to as "ethoxyline" resins. See Chemical Week, vol. 69, page 27, for September 8, 1951.

A group of polyepoxides not specifically illustrated in the above-noted patent comprise the glycidyl ethers of novalac resins which resins are obtained by condensing an aldehyde with a polyhydric phenol. A typical member of this class is the epoxy resin from formaldehyde 2,2-bis- (5-hydroxyphenol) propane novalac resin which contains as predominant constituent the substance represented by the formula

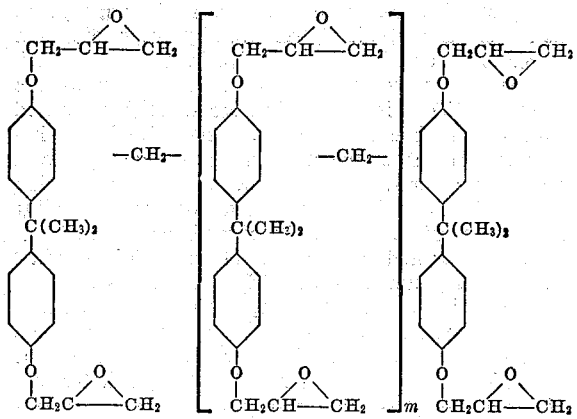

wherein $m$ is a value of at least 1.0. For the nature and preparation of novalac resins, see the book by T. S. Carswell, Phenoplasts, 1947, page 29, et seq.

Another group of polyepoxides include the glycidyl polyethers of a polyhydric phenol which has two hydroxyaryl groups separated by an aliphatic chain of at least six carbon atoms in the chain and with the chain being attached by carbon-to-carbon bonding to a nuclear carbon atom of the hydroxylaryl groups. Suitable phenols used for preparing these resins comprise those obtained by condensing phenol with a phenol having an aliphatic side chain with one or more olefinic double bonds positioned in the chain so the required separating atoms are present between two hydroxyphenol groups of the resulting polyhydric phenol. Cardanol, obtainable in known manner from cashew nut shell liquid, is a convenient source of phenols containing such side chain. Mixed grades of cardanol containing about equal amounts of m-(8-pentadecenyl)phenol and a phenol with a 15 carbon atom side chain having two double bonds similarly removed from the aromatic nucleus are available from the Irvington Varnish and Insulator Company.

Of special interest are the polyepoxides containing only elements selected from groups consisting of C, H, O and Cl.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts described in the examples are parts by weight.

The polyepoxides referred to in the examples, such as Polyether A, are those referred to in U. S. 2,633,458. Polyethylene glycol 400 refers to polyethylene glycol having a molecular weight of 400.

*Example I*

(a) This part of the example illustrates the improvement in pot life obtained by employing $BF_3$ ethylamine in admixture with polyethylene glycol having a molecular weight of 400.

3 parts of $BF_3$ ethylamine was dissolved in 3 parts of polyethylene glycol having a molecular weight of about 400 at room temperature. This mixture was then added to 100 parts of Polyether A and the combined mixture heated to 120° F. The viscosity of the solution was measured periodically. The results are shown in the attached graph as line B. The viscosity of a similar solution containing 3 parts of $BF_3$ ethylamine without the polyethylene glycol is shown in the same graph as line A. It is quite apparent from this graph that the presence of the polyethylene glycol causes an unexpected improvement in the pot life of the Polyether A mixture.

(b) This part of the example illustrates the unexpected improvement in flexibility that is obtained by using the $BF_3$ ethylamine in combination with polyethylene glycol.

3 parts of $BF_3$ ethylamine was dissolved in 40 parts of polyethylene glycol 400 at room temperature and the resulting mixture added to 100 parts of Polyether A. This mixture was then poured into container so as to form a casting having a thickness of ¼". When heated to 150° C., the mixture gelled to give a hard colorless casting. The casting when removed displayed good flexibility as it could be bent until the opposite edges touched without breaking.

Coatings of the above mixture when spread on steel panels and cured at 150° C. displayed excellent impact resistance and good chemical resistance.

*Example II*

This example illustrates the improvement in pot life obtained by employing $BF_3$ diethylamine in combination with polyethylene glycol 400.

3.75 parts of $BF_3$ diethylamine was dissolved in 5 parts of polyethylene glycol 400 at room temperature. This mixture was then added to 100 parts of Polyether A. The combined mixture was allowed to stand at room temperature and did not gel even after standing under these conditions for 1 month.

A portion of the above mixture was heated after formation to 150° C. In 16 minutes, the mixture gelled and formed a hard casting having good flexibility and impact resistance.

Related results are obtained by replacing Polyether A in the above process with equal amounts of each of the following: Polyether B, Polyether C and Polyether E.

*Example III*

This example illustrates the improvement in pot life and other properties obtained by employing $BF_3$ triethylamine in combination with polyethylene glycol.

4.5 parts of $BF_3$ triethylamine was dissolved in 5 parts of polyethylene glycol 400 at room temperature. This mixture was then added to 100 parts of Polyether A. The combined mixture was allowed to stand at room temperature and did not gel even after standing under these conditions for 1 month.

A portion of the above mixture was heated after formation to 150° C. In several hours, the mixture had set to form a hard casting having good flexibility and impact resistance.

*Example IV*

This example illustrates the improvement in pot life and other properties obtained by employing $BF_3$ butylamine in combination with polyethylene glycol.

3.7 parts of $BF_3$ butylamine was dissolved in 5 parts of polyethylene glycol 400 at room temperature. This mixture was then added to 100 parts of Polyether A. The combined mixture was allowed to stand at room temperature and did not gel even after standing under these conditions for 1 month.

A portion of the above mixture was heated after formation to 150° C. In 8 minutes, the mixture had set up to form a hard casting having good flexibility and impact resistance.

Related results are obtained by replacing the polyethylene glycol in the above process with equal amounts of each of the following: triethylene glycol, dipropylene glycol and 1,2,6-hexanetriol.

*Example V*

This example illustrates the improvement in pot life and other properties obtained by employing $BF_3$ dimethylaniline in combination with polyethylene glycol.

5 parts of $BF_3$ dimethylaniline was dissolved in 5 parts of polyethylene glycol 400 at room temperature. This mixture was then added to 100 parts of Polyether A. The combined mixture was allowed to stand at room temperature and did not gel even after standing under these conditions for 1 month.

A portion of the above mixture was heated after formation to 150° C. The mixture set up to form a hard casting having good flexibility and impact resistance.

Related results are obtained by replacing Polyether A in the above process with equivalent amounts of each of the following: Polyether B, Polyether C and Polyether D.

Example VI

This example illustrates the cure of Polyether A using $BF_3$ aniline in combination with polyethylene glycol 400.

4.3 parts of $BF_3$ aniline was dissolved in 5 parts of polyethylene glycol 400 at room temperature. This mixture was then added to 100 parts of Polyether A. This combined mixture possessed a longer pot life than a similar mixture containing $BF_3$ aniline by itself. When heated to 150° C., the mixture set up to form a hard casting having good flexibility and improved impact resistance.

Example VII

This example illustrates the cure of Polyether A using $BF_3$ m-phenylenediamine dissolved in polyethylene glycol 400.

3.2 parts of $BF_3$ m-phenylenediamine was dissolved in 5 parts of polyethylene glycol 400 at room temperature. This mixture was then added to 100 parts of Polyether A. This mixture possessed a longer pot life than similar mixture containing only $BF_3$ m-phenylenediamine. When heated to 75° C., the mixture gelled in 5 minutes to form a hard casting having excellent flexibility and impact resistance.

Related results are obtained by replacing the polyethylene glycol 400 in the above process with equal amount of each of the following: tripropylene glycol, glycerol, and trimethylolpropane.

Example VIII

This example illustrates the cure of Polyether A using $BF_3$ benzidine dissolved in polyethylene glycol 400.

4.25 parts of $BF_3$ benzidine was dissolved in 5 parts of polyethylene glycol 400 at room temperature. This mixture was then added to 100 parts of Polyether A. This mixture showed longer pot life than a similar mixture containing only $BF_3$ benzidine. When heated to 100° C., the mixture gelled to form a hard casting having good flexibility and impact resistance.

Example IX

This example illustrates the cure of Polyether A using $BF_3$ methylene dianiline dissolved in polyethylene glycol 400.

4.5 parts of $BF_3$ methylene dianiline was dissolved in 5 parts of polyethylene glycol 400 at room temperature. This mixture was then added to 100 parts of Polyether A. This mixture showed longer pot life than similar mixture containing only $BF_3$ methylene dianiline. When heated to 125° C., the mixture gelled to form a hard casting having good flexibility and impact resistance.

Example X

This example illustrates the cure of Polyether A using $BF_3$ p-phenylenediamine dissolved in ethylene glycol.

3.2 parts of $BF_3$ p-phenylenediamine was dissolved in 5 parts of ethylene glycol and the mixture added to 100 parts of Polyether A. This mixture showed longer pot life than similar mixture containing only $BF_3$ p-phenylene diamine. On heating to 50° C., the mixture gelled and resulting product was hard casting having good flexibility and impact resistance.

Related results are obtained by replacing the ethylene glycol with equal amounts of each of the following: 1,2,6-hexanetriol, propylene glycol and dipropylene glycol.

Example XI

This example illustrates the cure of Polyether A using $BF_3$ aniline dissolved in diethylene glycol.

2.4 parts of $BF_3$ aniline was dissolved in 5 parts of diethylene glycol and the mixture added to 100 parts of Polyether A. This mixture showed longer pot life than similar mixture containing only $BF_3$ aniline. On heating to 75° C., the mixture gelled in 1 hour and the resulting product was a hard casting having good flexibility and impact resistance.

Example XII

This example illustrates the cure of Polyether A using $BF_3$ ethylaniline dissolved in dipropylene glycol.

2.5 parts of $BF_3$ aniline was dissolved in 5 parts of dipropylene glycol and the mixture added to 100 parts of Polyether A. This mixture possessed a longer pot life than a similar mixture containing only $BF_3$ aniline and Polyether A. On heating to 75° C., the mixture gelled in 1 hour and the resulting product was a hard casting having good flexibility and impact resistance.

Example XIII

This example illustrates the cure of Polyether A using $BF_3$ aniline dissolved in polyethylene glycol 15-200.

4.3 parts of $BF_3$ aniline was dissolved in 5 parts of polyethylene glycol 15-200 and the mixture added to 100 parts of Polyether A. This mixture possessed a longer pot life than a similar mixture containing only $BF_3$ aniline and Polyether A. On heating to 75° C., the mixture gelled in 10 minutes and the casting formed was hard and had good flexibility and impact resistance.

Example XIV

This example illustrates the cure of Polyether A using $BF_3$ phenol dissolved in diethylene glycol.

Portions of $BF_3$ phenol as indicated in the table were dissolved in the indicated portions of diethylene glycol, and the mixtures added to 100 parts of Polyether A. In each case, the mixtures gelled in a short time to form hard, flexible castings.

| Amount of $BF_3$ Phenol | Amount of Diethylene Glycol |
| --- | --- |
| 1.0 | 15 |
| 0.5 | 15 |
| 0.25 | 15 |
| 0.5 | 5 |
| 0.5 | 20 |
| 0.5 | 30 |
| 0.5 | 50 |
| 0.5 | 20 |
| 0.5 | 20 |

Example XV

This example illustrates the cure of Polyether A using $BF_3$ phenol dissolved in polyethylene glycol.

Portions of $BF_3$ phenol as indicated in the table were dissolved in the indicated portion of varying types of polyethylene glycols. In each case, the mixtures gelled in a short time to form hard, flexible castings.

| Amount of $BF_3$ Phenol | Type of Poly-Ethylene Glycol | Amount of Glycol |
| --- | --- | --- |
| 0.5 | Polyethylene glycol 200 | 20 |
| 0.5 | Polyethylene glycol 300 | 20 |
| 0.5 | Polyethylene glycol 400 | 20 |
| 0.5 | Polyethylene glycol 600 | 20 |
| 0.5 | Dipropylene glycol | 17.5 |

Example XVI

This example illustrates the cure of Polyether A using $BF_3$ phenol dissolved in dipropylene glycol.

0.5 part of $BF_3$ phenol was dissolved in 17.5 parts of dipropylene glycol. This mixture was then added to 100 parts of Polyether A. The mixture gelled in a short time at 32° C. to form hard, flexible castings.

Example XVII

This example illustrates the cure of Polyether A using $BF_3$ ethylaniline dissolved in polyethylene glycol 400.

5 parts of $BF_3$ ethylaniline was dissolved in 5 parts of polyethyleneglycol 400 at room temperature. The mixture was then added to 100 parts of Polyether A. This mixture showed longer pot life than similar mixture containing only $BF_3$ ethylaniline. On heating to 100° C., the mixture gelled in 5 minutes. The resulting casting was hard flexible product having good impact resistance.

Example XVIII

This example illustrates the cure of Polyether A using $BF_3$ butylaniline dissolved in polyethylene glycol 400.

5.8 parts of $BF_3$ butylaniline was dissolved in 5 parts of polyethylene glycol 400 at room temperature. The mixture was then added to 100 parts of Polyether A. The mixture showed longer pot life than similar mixture containing only $BF_3$ butylaniline. On heating to 100° C., the mixture gelled. The resulting casting was hard flexible product having good impact resistance.

Related results are obtained by replacing Polyether A in the above process with equal amounts of each of the following: polyallyl glycidyl ether, diglycidyl ether of resorcinol, Polyether F and Polyether B.

Example XIX

This example illustrates the cure of Polyether A using $BF_3$-dimethyl formamide in polyethylene glycol 400.

3.6 parts of $BF_3$-dimethyl formamide was dissolved in 7 parts of polyethylene glycol 400. This mixture was then added to 100 parts of Polyether A. The mixture gelled in 7 minutes at 150° C. At room temperature there was no noticeable thickening at the end of 24 hours.

Related results are obtained by replacing the $BF_3$-dimethyl formamide in the above process with equal amounts of each of the following: $BF_3$-dimethylpropionamide, $BF_3$-acetamide and $BF_3$-diethylformamide.

Example XX

This example illustrates the cure of Polyether A using $BF_3$-dibutyl ether in polyethylene glycol 400.

1 part of $BF_3$-dibutyl ether was mixed with 10 parts of polyethylene glycol 400. This mixture was then added to 100 parts of Polyether A. It was possible to achieve thorough blending of the components to a homogeneous system before the mixture gelled. When 1 part of the $BF_3$-dibutyl ether was added to 100 parts of Polyether A directly, there was instantaneous gelation around each globule of the $BF_3$ etherate preventing adequate distribution of the catalyst in the resin.

Related results are obtained by replacing the $BF_3$-dibutyl ether in the above process with equal amounts of each of the following: $BF_3$-diamyl ether, $BF_3$-diisopropyl ether and $BF_3$-methylphenyl ether.

We claim as our invention:

1. A process for resinifying polyepoxides which comprises mixing and reacting a polyepoxide having a

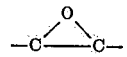

epoxy equivalency greater than 1.0 with a mixture of (1) an addition product of $BF_3$ and a member of the group consisting of amines, amides, ethers and phenols, and (2) a liquid aliphatic polyhydric alcohol having a molecular weight above 100.

2. A process for resinifying a glycidyl ether of a component of the group consisting of polyhydric phenols and polyhydric alcohols which comprises mixing and reacting a glycidyl ether with a mixture of a $BF_3$-amine addition product and a liquid aliphatic polyhydric alcohol having at least two OH groups and a molecular weight above 100.

3. A process as in claim 2 wherein the $BF_3$-amine complex is $BF_3$-ethylamine addition product.

4. A process as in claim 2 wherein the $BF_3$-amine complex is $BF_3$-diethylamine addition product.

5. A process as in claim 2 wherein the $BF_3$-amine complex is $BF_3$-aniline addition product.

6. A process as in claim 2 wherein the $BF_3$-amine complex is $BF_3$-benzyldimethylamine addition product.

7. A process as in claim 2 wherein the liquid aliphatic polyhydric alcohol is a polyethylene glycol having a molecular weight between 100 and 600.

8. A process as in claim 2 wherein the liquid aliphatic polyhydric alcohol is diethylene glycol.

9. A process as in claim 2 wherein the liquid aliphatic polyhydric alcohol is dipropylene glycol.

References Cited in the file of this patent

UNITED STATES PATENTS

| | | |
|---|---|---|
| 2,717,885 | Greenlee | Sept. 13, 1955 |
| 2,728,744 | May et al. | Dec. 27, 1955 |